Patented Jan. 25, 1949

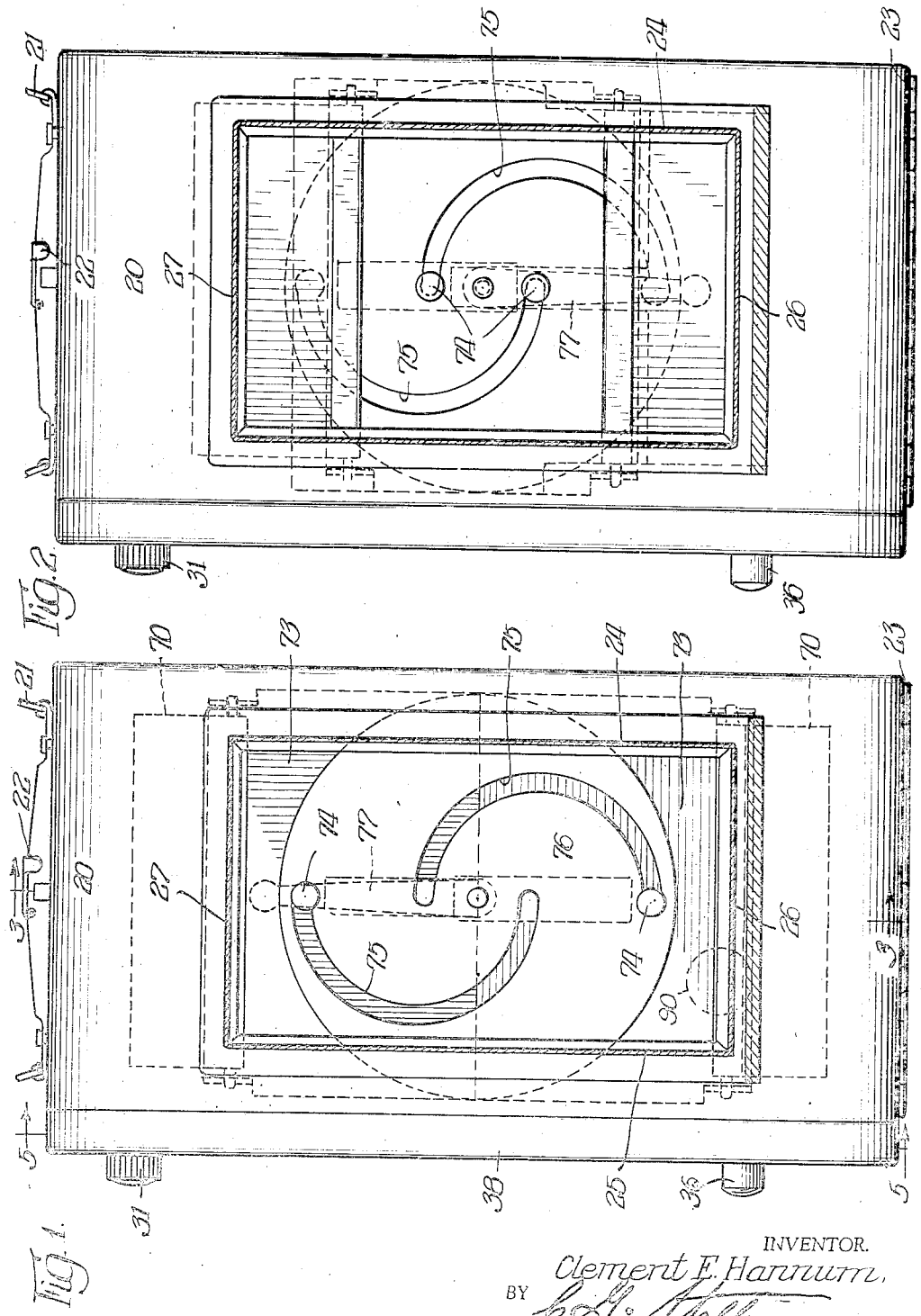

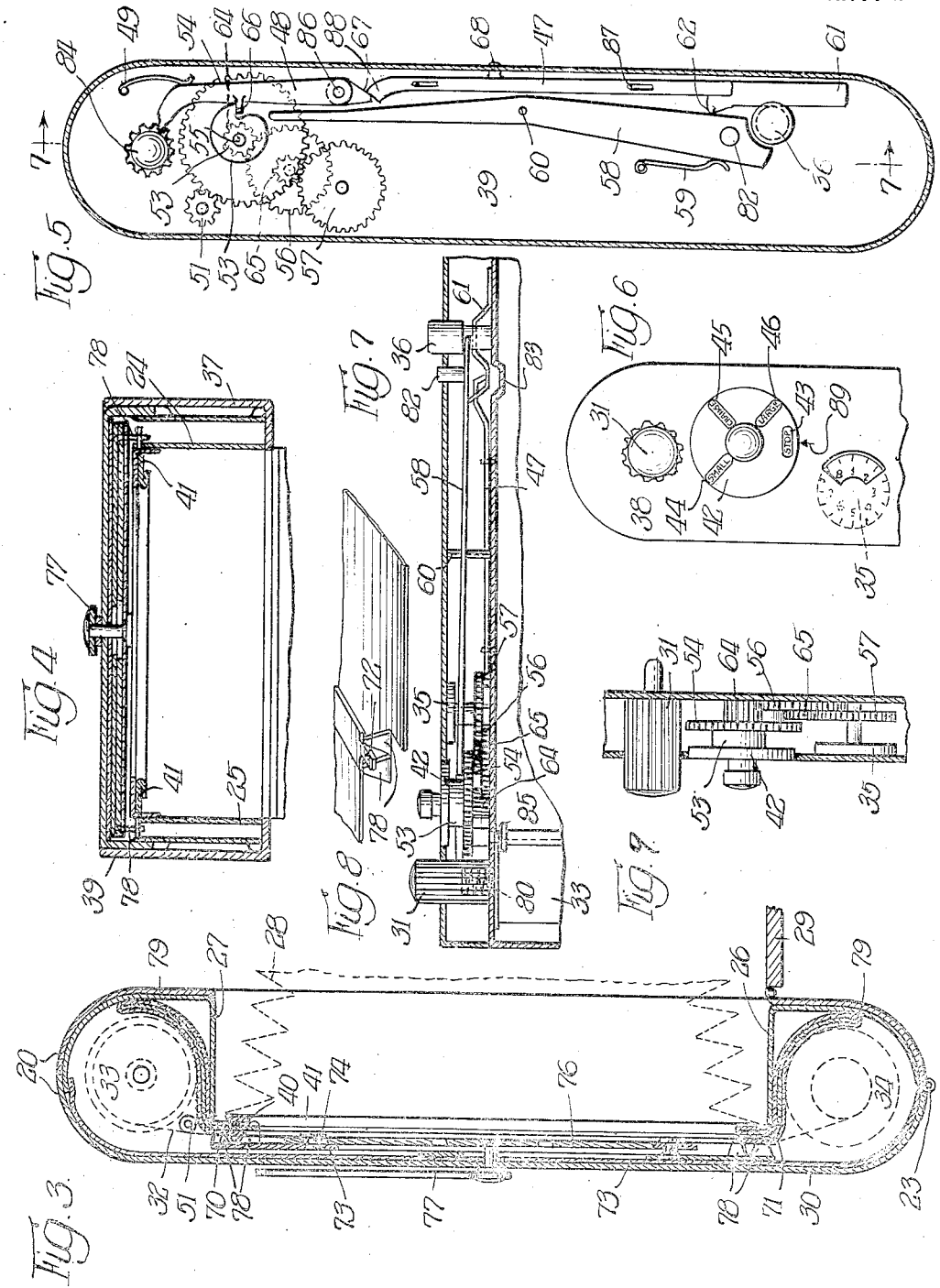

2,460,174

UNITED STATES PATENT OFFICE 2,460,174

CAMERA WITH VARISIZE FOCAL PLANE APERTURE

Clement E. Hannum, Chicago, Ill.

Application October 22, 1941, Serial No. 416,038

5 Claims. (Cl. 95—32)

This invention has to do with improvements in cameras. It is primarily directed to improvements in folding cameras such as are used by the general public for snapshots, but the invention is applicable to other types of cameras, and the present disclosure is primarily illustrative.

It is an object of the present invention to provide an arrangement whereby the amount of film exposed to action by the shutter of the camera may be varied. It is a further object of the present invention to provide an arrangement varying the size of the exposure of the film in the camera to the action of the shutter, which means is particularly adaptable to a folding camera and which means does not interfere with the normal use of the camera.

In this connection, it is an object to provide a preferred arrangement wherein the camera incorporates the principle operating mechanism behind the film, and the sliding panels are incorporated in the camera in front of the film, the means engaging and operating the sliding panels are disengaged when the camera is open for insertion of film, but are automatically engaged when the camera is closed whereby the size of the exposure may be varied at the will of the operator.

It is a further object of this invention to provide a special camera arrangement for operating the sliding panels.

It is a further object of the present invention to provide a specialized construction which is particularly adaptable to the small spaces available for such an arrangement but which will be relatively inexpensive to incorporate in a camera during manufacture and which will be strong, durable and easily operated.

It is another object of the present invention to provide a special means for controlling the film to synchronize movement of said film to the size of picture to be taken.

It is another object of the present device to provide an arrangement wherein the camera may be operated to take different size pictures without waste of film, the arrangement being such that the movement of the film from one picture to another is variable with the size of the picture so that the next picture starts where the last picture left off in the same way it would where the camera is devoted to a single size picture. By this arrangement, the operator may vary the size of the exposed negative to suit his taste and secure a very definite saving in the amount of film used for numerous different pictures.

It is another object of the present invention to provide an arrangement which does not add materially to the weight of the camera but which, in addition to the above mentioned object, increases the strength of the camera.

It is another object of the present invention to provide a novel construction of double exposure preventer mechanism. In this connection, it is an object to provide an arrangement wherein the camera must be reset and the exposure button either manually or automatically released in the resetting operation for each picture taken.

It is an object to provide a novel construction and arrangement of parts for accomplishing the purpose and results herein disclosed.

Other objects and advantages of the invention will appear as the nature of the improvements is better understood, the invention consisting substantially in the novel construction, combination and arrangement of parts hereinafter fully described, illustrated in the accompanying drawing, and finally pointed out in the appended claims.

In the drawings:

Figure 1 is a front view of a camera, showing a plan of the interior of the camera, the bellows and camera shutter being removed. The view shows the sliding panels in dotted lines in wide open position, the position for taking the largest size picture of which the camera is capable;

Figure 2 is a view similar to that of Figure 1, but it shows the sliding panels (hereinafter called panels) in position for the smallest size picture of which the camera is capable with this arrangement, the sliding panels being partly shown in dotted lines;

Figure 3 is a longitudinal cross sectional view taken on the lines 3—3 of Figure 1, looking in the direction of the arrows, Figure 3 indicating by dotted lines the presence of bellows which has been omitted from Figure 1;

Figure 4 is a fragmentary cross sectional view through substantially the center of the camera case, the view showing the bellows in fragmentary illustration, and showing the panel operating mechanism in cross section;

Figure 5 is a longitudinal sectional view taken on the lines 5—5 of Figure 1, looking in the direction of the arrows;

Figure 6 is a fragmentary view of the controls and film indicator means whereby the position of the film is shown by dials and markers;

Figure 7 is a fragmentary cross-sectional view taken substantially on the line 7—7 of Figure 5, looking in the direction of the arrows, showing the winding mechanism and film controls, including the double exposure preventer arrangement; and Figure 8 is a fragmentary view showing schematically one arrangement whereby the cam operated panel moving members are detachably secured to the sliding panels, as will be the case when the back portion of the camera is in place; the form of the inter-locking arrangement being clearly shown.

Figure 9 is a fragmentary, cross-sectional view.

Referring more in detail to the construction shown in the various figures, and referring first to Figures 1, 2, and 3 in particular, I show my improvements as applied to an ordinary folding camera of the bellows type, common on the market today. The case 20 (so designated in its entirety) has the handle 21, and the latch means 22, the case 20 being formed of the case front 79 and the back plate 80 (see Fig. 3), usually hinged together by such means as the hinge 23, whereby the case may be opened for the insertion and removal of film in the usual manner.

The case front 79 is provided on one side with the outer side wall 37, and on the other side with the cover plate 38 and outer side wall 39. The case front 79 has the usual well portion comprising the inner side walls 24 and 25, and the inner end walls 26 and 27; these inner walls are flanged at their bottom edge portions (see particularly Fig. 3) as shown by the flange 41. The sidewall portions of this flange 41 serves as one side, or what may be called the top, of the channel or bearing surfaces for the sliding panels 70, hereinafter described.

The bed 29, a fragmentary portion of which is shown in Fig. 3, serves as a cover for the well portion or exposure chamber portion of the case 20, when the bellows 28, and lens and lens shutter (not illustrated), are folded back into the case well portion and the camera closed. The bed 29 serves also as a guide and support for the bellows when open in the usual manner for such cameras. The bellows are usually attached by any convenient means to the flange 41, such as by the bead 40, which is probably best illustrated in Figure 3.

I have provided the usual roll type film 32, which is wound onto the spool 33 from the film spool 34. The winding knob 31 for winding the film, is slidably inserted into the case and engages the film roll 33. It is adapted to slide upon being lifted by the operator, so that it becomes disengaged from the spool 33. It may, if desired, although it is not necessary, be provided with the spring means 80 which holds the ratchet 84 in the position shown in Figure 7. This ratchet is slidable with respect to the spindle of the winding knob, in a longitudinal direction thereof, whereby the winding knob 31 may be pulled out far enough to disengage the spool 33 for the insertion and removal of film spools. However, the ratchet is not separately rotatable with respect to the film winding knob 31. When the film winding knob is turned, the ratchet 84 rotates therewith.

The camera is also provided with the film measuring and metering device, sometimes called an exposure counter, 35. See Fig. 6. In the arrangement here shown it is more truly a measuring device for the film than an exposure counter. It will not accurately count the "exposures" unless the large size exposures are used exclusively. However, the user can accurately gauge the amount of film remaining for exposure, by use of the film meter 35. He will, at a glance, know if he has taken half the film or some other amount, and can accurately estimate whether he has enough for the next picture of the size he wishes to make.

I have also provided the exposure button 36, which will be recognized as common to cameras, but which is here of a special arrangement, preferably, for use with a double exposure preventing mechanism, hereafter described. (See Fig. 7.)

In Figures 5, 6, and 7, is illustrated an indicator, herein termed "marker button" 42, which is used by the operator to coordinate or synchronize movement of the film with the other mechanism of the camera for the different size exposures, and for releasing the exposure button from engagement with the double exposure preventer mechanism, under certain conditions. This marker button 42 is provided indicia such as the markers 43 (stop), 44 (small), 45 (change) and 46 (large). The marker button 42 is used in a manner hereinafter shown, to regulate the movement of the film winding mechanism, through cooperation of the film winding knob 31 and ratchet 84, and other mechanism.

Referring particularly to the constructions shown in Figures 5 and 7, I show a novel arrangement for preventing double exposures on the same film, which comprises an undercut ledge portion or shaft portion 81 of the exposure button 36. When the exposure button 36 is fully away from the pressed position—that is, is entirely out—the end of the lever arm or lever 58, will slide under the ledge and contact the shaft 81, holding the button against downward movement and double exposure operation. The lever 58 is movably journaled under pressure of the spring 59, whereby it will have a rotative movement about its pin 60, the pressure of the spring 59 exerting tension to move it into the undercut portion of the button 36 at the button end of the lever. Before the button 36 can be depressed far enough to take a picture, it is necessary to disengage the lever 58 from the button, which will be done in the manner hereinafter explained. I have provided a spring member, called bar-spring 61, which is preferably located as shown in Figures 5 and 7, with one end attached to the case 20 in any convenient manner (the attachment being to the outer side-wall 39 in the arrangement shown). This bar-spring is located under the ledge or undercut portion of the button 36 whereby downward pressure on the button 36 will ordinarily push the bar spring 61 downward. It is desirable to provide a recessed portion, or hole, 83 in the side-wall in position so that the downwardly curved portion of the bar spring will fit therein when the button 36 exerts pressure on the bar spring. The bar spring has its other end portion from that attached to the camera case shaped as shown in Figure 7 whereby the end extends upward in a curve. Other shapes are equally advantageous, such as a flanged portion or even a portion struck straight upward. This is for the purpose of presenting the side surface of the bar spring 61 at said last mentioned end to the lever arm 58. When the bar spring 61 is not depressed, it will contact the side of the lever arm 58 and hold the lever arm 58 away from the button 36. In this arrangement, the button 36, upon being depressed for taking a picture, will pass the lever arm 58 with the undercut portion of the button before the button depresses the bar spring 61 to a position where it will release the lever arm 58 allowing the lever 58 to move against the side-wall of the button 36. The lever 58 will then normally remain in contact with the button 36 but will not hold said button against movement until the button is allowed to rise. When the button rises, the lever 58 under the tension of the spring 59, will slide under the undercut portion of the button 36 and will contact the shaft 81 of said button. In this position it prevents the button 36 from being depressed far enough to release the shutters. The lever 58 remains in said locking position until the device is reset or the lever is manually moved out of engagement by means of the thumb set 82.

For the purpose of regulating the movement of the film and synchronizing or coordinating it to the size of the picture to be taken, I have provided the marker button 42, as above indicated. This marker button preferably is made integral with the cam 53 so that movement of the marker button moves the cam 53 and vice versa. The marker button and cam are frictionally fitted to axle means such as a small metallic sleeve which in turn rotatably seats over a fixed axle. For the purposes of this application, however, the sleeve can be omitted and the marker button can be frictionally fitted over a rotatable axle. Accordingly, the arrangement will be referred to as spindle 55 which means the rotatable sleeve or axle on which is frictionally fitted the cam 53 and marker button 42. The spindle 55 is fixedly connected to a large gear wheel 54 and rotates therewith. The gear wheel 54 is driven by the roller 51, see Figures 5 and 7, which has a small gear wheel thereon. The roller 51 is provided with means such as the tooth wheel 85, which engages the film and positively operates the roller 51 upon movement of the film 32.

The cam 53 and marker button 42 normally rotate with the spindle 55 when the spindle is actuated by the large gear wheel 54 and roller 51. Thus movement of the film normally rotates the marker button 42 and cam 53. The marker button 42 and cam 53 are rotatable by manual pressure as for example, by the fingers of the operator, irrespective of the rotation of the spindle 55. In this way, the operator can set the marker button as hereinafter shown.

The camera is provided with the pawl 48, see particularly Figure 5. This pawl, 48, is rotatably journaled on a pawl pin 86. The pawl 48 is adapted to engage in the position shown in Figure 5, the ratchet 84, which prevents the ratchet 84 from rotating and prevents the film 32 from being wound on the spool 33 by turning the winding knob 31. The pawl is held in engagement with the ratchet 84, and under tension tending to move it toward the ratchet 84 by means of the spring 49 or some similar arrangement. The ratchet is provided with a projection 66, however, which sets in the position shown on Figure 5 in the depressed portion of the cam 53. Rotation of the cam 53 will disengage the pawl from the ratchet 84, the cam being provided with an uneven surface such as illustrated in Figure 5. When the pawl 48 is disengaged from the ratchet 84, the film winding mechanism may be turned. I have likewise provided the slide bar 47 which is slidable longitudinally on the pins 87 for which a small opening is provided.

The pawl 48 is provided with the vertical plane surface 67 which is inclined as shown in Figure 5 to form a bearing surface for engagement by the slide bar 47. The slide bar, preferably likewise is provided with an end inclined plane surface 88, herein called cam portion 88 matching the incline of the portion at 67. The slide bar 47 is preferably provided with a boss or thumb button 68, for manual movement by the operator. This manual movement by the operator shoves the slide bar 47 against the inclined end portion 67 of the pawl and moves the pawl out of engagement with the ratchet 84. The opposite end of the slide bar 47 is bent over the end of the bar spring 61 in the arrangement shown in Figure 7, and when the slide bar 47 is shoved against the pawl 48 to disengage the pawl from the ratchet 84, the slide bar likewise depresses the bar spring 61 into the recess 83 and the lever 58 moves into engagement with the exposure button shaft 81 locking the exposure button and preventing accidental exposure of the film. The operation just described is for the purpose of inserting film into the camera and winding the film up to the initial position for the first exposure. This is necessary by reason of the fact that the marker button and cam would ordinarily release the pawl on each revolution of the cam 42 when it reaches the position shown in Figure 5, stopping the winding of the film. Thus, for the initial insertion of the film, the slide bar 47 is used.

After the film is in position for the first exposure, the lever 58 is released from the locking position under the exposure button by manual pressure on the thumb set 82. The slide bar 47 is then disengaged from the pawl by moving such slide bar to the position as shown in Figure 5 upon which the pawl engages and locks the winding knob ratchet 84. The picture is ready to be taken and the button 36 is depressed for that purpose.

It is understood, of course, that the various pictures taken after the initial film winding operation and first picture do not require the use of the slide bar 47 or the thumb set 82. For the initial picture the metering device 35 is set on the No. 1, said metering device being frictionally fitted to its shaft which is in turn driven by the counter gear 57, by means of the intermediate gear 56, pinion 65, and spindle gear 64, in turn driven by the large gear wheel 54, from the roller and roller gear 51. The metering device 35 will thus reflect the amount of film turned past the roller 51, and will give an accurate reading of the film setting.

The cover plate 38 has the arrow or start indicia 89, which is the initial position from which the markers 43, 44, 45 and 46 are set or positioned (as hereinafter described). The construction shown particularly in Figures 1, 2 and 3 comprises the novel arrangement for varying the size of the openings to which the film is exposed through the action of the lens shutter. I have shown the sliding panels 70 (sometimes hereinafter referred to as panels 70). These panels 70 are carried in a channel or frame formed with the flange portions 41 as a top bearing surface (best illustrated in Figures 3 and 4) with a metallic strip 71 forming the bottom bearing surface of the channel. This metallic strip 71 is carried around the bottom of the end walls 26 and 27 and curved into the spool housing compartment as indicated particularly in Fig. 3. This completes a channel for the sliding panels. These sliding panels are preferably made of thin metallic composition such as brass with a reinforced inner edge, having the projection herein called a catch 72. These sliding panels are flexible and are moved around the curved portions into the ends of the channel formed by the strip 71 and sidewall flange 41. As indicated particularly by the arrangement shown in Figs. 1 and 2, these panels are adapted to close the opening between the lens shutter and the film, to the extent desired by the operator within the limits of the camera. For moving the panels, I have provided a novel arrangement of two plates actuated by a cam arrangement which is in turn operated by a lever outside the camera case. These two plates consist of the plates 73 which have the upstanding buttons 74. These buttons 74 fit into the cam shaped grooves 75 of the cam plate 76. This cam plate 76 is attached to a size lever 77 (shown in dotted lines in Figs. 1 and 2) on the back of the camera case. Turning of the lever turns the cam plate 76 and moves the plates 73 together or apart longitudinally into the back of the camera case. These plates 73 are slideable underneath the cam plate 76. They are provided with an upstruck V-shaped member 78 on each of the two outer end corners of each plate. These V-shaped members seat down over the respective catches 72 as shown in Fig. 8, when the back of the camera case is closed and engage the catches 72. Movement of the size lever 77 then turns the cam plate 76 moving the plates 73 by means of the cam grooves 75 and buttons 74, and thereby likewise moving the panels to a position for either small or large openings, as desired. The movement of the film is coordinated by means of setting the marker button 42 and proceeding as above described in connection with the film winding and release of the exposure button 36.

The arrangement is such that in actual operation the camera case back plate 30 is opened and the film roll 34 is inserted in the proper compartment, the film 32 being stretched along the back of the camera between the back plate 30 (when returned to a position closing the camera case) and the sliding panels 70, the latter being between the film and camera shutter and lens. The winding key or knob mechanism engages the spool 33 to which the free end of the film 32 is attached. The pawl 48 is released after snapping shut the cover plate 30 by pressure on the thumb button 68. The V-shaped member 78, when the cover is snapped shut, engages the catch 72. The winding knob is turned (the exposure button 36 being automatically locked against exposure as hereinbefore explained) and the film is moved to where the film window of the camera (shown as 90 in Figure 1) discloses the initial position for the first picture, which will be at, or approximately at, the numeral 1 on the film. The exposure counter 35 is then manually moved to the No. 1 position by turning it against its friction set, on its shaft or spindle. The lever 58 is pulled back by means of the thumb set 82 allowing the upstruck end 62 of the bar spring 61 to move up alongside the lever 58, holding it out of engagement with the button 36 and thus releasing the button for operation in making an exposure. The size lever 77 is properly positioned for the size of exposure desired, and the picture may then be taken by pressing the button 36. When the button 36 is pressed, the lever 58 is released by the downward movement of the bar spring 61, and engages the side of the button 36. The button 36 then, upon release, moves upward and the lever 58 locks it against upward movement.

In order to move the film and reset the device, the marker button 42 is turned as hereinafter explained. This turns the cam 53, moves the pawl out of engagement with the ratchet 84. The winding knob is then turned a sufficient amount to bring the marker 43 (stop) to the position of the indicia 89. At this position, the pawl will drop back into engagement with the ratchet 84, and the cam 53 will have contacted and passed the end of the lever 58, moving it about its pin 60 out of engagement with the button 36, and allowing the end 62 of the bar spring 61 to move up alongside the lever 58 and engage the lever holding it out of the position where it would lock the button 36, thus releasing the button 36. The film in the meantime has moved up the correct amount by reason of the turning of the winding knob, so that the film is placed in the proper position for the size exposure desired. The size lever 77 is or must be set for the size film desired, thus coordinating it with the movement of the winding mechanism. The camera is ready for another picture.

In moving the film up, the amount of movement is determined by the marker button positioning as follows:

If the picture just taken has been a large picture and it is desired to take another large picture, the marker button is turned until the marker indicia 46 (large) is by the start indicia 89. The winding knob is then turned until the marker button shows the marker indicia 43 (stop) at the start indicia position 89. The picture may then be snapped.

If a small picture has last been taken and it is desired to repeat the small picture, then the same procedure is followed except that the small marker indicia 44 is set between start indicia 89 by manual operation, and the winding knob is then turned until the stop marker 43 is at the position of the start indicia 89. The camera is then ready for another small picture.

If it is desired to change from large to small, or small to large, the marker button is moved up to the marker indicia 45 (change) and the winding knob is turned until the stop indicia 43 is in place beside the start indicia 89. This latter operation is followed regardless of whether the operator is changing from large to small or from small to large, and will move the proper amount of film for such change. Of course, when the change is made, the size lever 77 must be moved to bring the panels 70 in position for the correct size exposure.

The slide bar 47 could be eliminated but, in such case, it would be necessary to rotate the marker button 42 in initially inserting the film each time the pawl drops into the depressed portion of the cam 53 until the film reaches the correct position for the initial picture. It is believed desirable, therefore, to have the slide bar 47 which operates as heretofore described.

The lever 77 preferably is provided with indicating means indicating the size of the opening to which the shutters are set. It will be understood that in the embodiment, I have provided the plates 73 and cam plates 76 in the back cover behind the film, the V-shaped members 78 extended down alongside the film on either side. The plates 73 must be provided, of course, with slot in their middle portion around the axle attaching the cam plate 76 to the lever 77. The shutters are disengaged from the V-shaped members 78 in normal operation when the back is open for the insertion of film.

The sliding panels are preferably constructed of a flexible material. I have found that a light gauge sheet brass is sufficiently strong to make an excellent sliding panel for the purposes desired.

The form of the invention herein shown and described presents a preferred embodiment thereof, and delineates its adaption to practical use, but it is to be understood that the present disclosure is to be considered from the illustrative standpoint and not as imposing restriction or limitation on the invention.

While I have herein shown and described certain features of my invention, still I do not wish to limit myself thereto, except as I may do so in the claims.

I claim:

1. In a folding camera of the type described, having the usual roll type film, bellows, case with hinged back and button operated lens means; a means for regulating the amount of exposure reaching the film on any particular exposure in snapping a picture, said regulating means comprising, in addition to the regular shutter means, a plurality of adjustable sliding panels carried within the camera case between the film and the lens means and closely adjacent to the film, said sliding panels being movable to regulate the size of the opening between the film and the regular shutter and lens means of the camera, and means positioning the sliding shutters at predetermined locations, said last mentioned means being operable by means outside the camera case; means controlling the movement of the film in an amount corresponding to the size of the opening between the sliding panels, said film moving means comprising a film winding knob engaging the roller on which the film is being wound, a ratchet attached to said film winding knob, a roller rotated by film within the camera, a large gear wheel engaging gear means on said roller and operated by said roller on movement of the film, a cam and marker button carried by said large gear means and normally movable therewith, said gear and marker button means being likewise independently movable, a pawl engaging said winding button mechanism and locking the same against rotation, said cam engaging said pawl and releasing said winding button upon rotation of said marker button, markers on said marker button, a starting marker on said camera case adjacent said marker button, an exposure counter normally driven through said large gear wheel and normally movable for setting, and a double exposure preventing means.

2. In a device of the class described comprising a camera, having an exposure chamber, shutters and shutter lens means, and film and film winding mechanism; a means regulating the movement of film for different size pictures taken with the regular shutter and lens means, said film regulating means comprising a film winding knob engaging a spool on which the film is wound, a film spool from which the film is wound to the first mentioned spool, a ratchet carried by said film winding knob, a pawl removably engaging said ratchet and preventing movement of the film winding mechanism, a roller driven by movement of the film, a cam in turn driven by said roller, a marker button on said cam, said cam and marker button being movable independently of movement of the film, but normally moving when the film moves, said cam means moving said pawl out of engagement with the above mentioned ratchet means, the arrangement being such that movement of the cam and marker button releases the film winding mechanism and winding of the film rotates said cam and releases the pawl locking the film winding mechanism, said marker button having indicia markers thereon indicating the position to which the marker is manually turned by the operator before winding the film, the indicia markers being variously spaced on the marker button whereby pre-selected amounts of film are moved in the film winding operation before the pawl again locks the ratchet and the winding mechanism.

3. In a device of the class described comprising a camera, having an exposure chamber, shutters and shutter lens means, and film and film winding mechanism; a means regulating the movement of film for different size pictures taken with the regular shutter and lens means, said film regulating means comprising a film winding knob engaging a spool on which the film is wound, a film spool from which the film is wound to the first mentioned spool, a ratchet carried by said film winding knob, a pawl removably engaging said ratchet and preventing movement of the film winding mechanism, a roller driven by movement of the film, a cam in turn driven by said roller, a marker button on said cam, said cam and marker button being movable independently of movement of the film, but normally moving when the film moves, said cam means moving said pawl out of engagement with the above mentioned ratchet means, the arrangement being such that movement of the cam and marker button releases the film winding mechanism and winding of the film rotates said cam and releases the pawl locking the film winding mechanism, said marker button having indicia markers thereon indicating the position to which the marker is manually turned by the operator before winding the film, the indicia markers being variously spaced on the marker button whereby pre-selected amounts of film are moved in the film winding operation before the pawl again locks the ratchet and the winding mechanism, means preventing double exposure comprising a lever movably journaled to said camera, one end of which lever is contacted by said marker button cam on rotation of said marker button cam, and the other end of which lever engages a shutter release button at the shaft of said button and in a position undercut on said button preventing the downward movement of said button to release the shutter, movable means such as a spring releasably holding said lever out of engagement with the said button whereby the said shutter release button was depressible to operate the shutter of the camera, said lever holding means being engageable by the button whereby pressing the button moves said holding means out of engagement of said lever and releases the lever, whereby it engages the button and prevents further exposure, said lever being moved out of engagement with the button by rotation with the marker cam in which event the lever holding means again engages the lever.

4. In a folding camera of the type described having the usual roll type film, bellows, shutter release means such as a shutter release button, exposure chamber, film winding mechanism, lens and lens shutter means; a means regulating the amount of film moved into position for exposure in the exposure chamber, said means comprising pawl engaging means in connection with said film winding mechanism and adapted to lock said film winding means against movement when engaged by said pawl and to release said winding means for winding the film when disengaged from said pawl, a pawl means releasably engaging said locking means under spring tension thereby locking said film winding means against movement, means comprising a cam operable to disengage said pawl from said film winding mechanism and to hold said pawl disengaged for a pre-selected movement of the film and then cause said pawl under spring tension to re-engage said film winding mechanism thereby locking the latter, manually operable means disengaging the pawl from said film winding mechanism, said manually operable means being provided with indicia and connected with said cam means determining the amount of film movable into the exposure position before the pawl again engages the locking means and slide bar means disengaging said pawl for the initial winding operation during the inserting and removing of film from the camera.

5. In a folding camera of the type described having the usual roll type film, bellows, shutter release means such as a shutter release button, exposure chamber, film winding mechanism, lens and lens shutter means; a means regulating the amount of film moved into position for exposure in the exposure chamber, said means comprising pawl engaging means in connection with said film winding mechanism and adapted to lock said film winding means against movement when engaged by said pawl and to release said winding means for winding the film when disengaged from said pawl, a pawl means releasably engaging said locking means under spring tension thereby locking said film winding means against movement, means comprising a cam operable to disengage said pawl from said film winding mechanism and to hold said pawl disengaged for a preselected movement of the film and then cause said pawl under spring tension to re-engage said film winding mechanism thereby locking the latter, manually operable means disengaging the pawl from said film winding mechanism, said manually operable means being provided with indicia and connected with said cam means determining the amount of film movable into the exposure position before the pawl again engages the locking means, slide bar means disengaging said pawl for the initial winding operation during the inserting and removing of film from the camera, shutter release locking means comprising a lever means under spring pressure movable to engage the shutter release means, a bar spring, a bar spring engaging by movement of the shutter release means, said bar spring releasably contacting said lever and holding it from engaging the shutter release means, the arrangement being such that movement of the shutter release means engages the bar spring, in turn disengaging from the lever and releasing the lever which in turn engages the shutter release means and locks it against a subsequent operation for releasing the shutter, said lever being journaled for movement into and out of engagement with the shutter release means, and said lever being positioned so that it is engaged by the pawl operating cam means and moved about its journal thus disengaging the lever from the shutter release means upon resetting the camera by movement of the pawl and winding the film.

CLEMENT E. HANNUM.

REFERENCES CITED

The following references are of record in the file of this patent:

UNITED STATES PATENTS

| Number | Name | Date |
| --- | --- | --- |
| 1,073,982 | Harper et all. | Sept. 23, 1913 |
| 1,680,647 | Stark | Aug. 14, 1928 |
| 2,002,824 | Mayer | May 28, 1935 |
| 2,233,238 | Baumgartner | Feb. 25, 1941 |

FOREIGN PATENTS

| Number | Country | Date |
| --- | --- | --- |
| 834,548 | France | Aug. 22, 1938 |
| 679,413 | Germany | Aug. 4, 1939 |